United States Patent
Lopez Reyes et al.

(10) Patent No.: US 9,623,798 B2
(45) Date of Patent: Apr. 18, 2017

(54) VIBRATION ABSORBING FEATURES FOR PLASTIC ASSEMBLIES

(71) Applicant: Continental Automotive Systems, Inc., Auburn Hills, MI (US)

(72) Inventors: Jose Francisco Lopez Reyes, Guadalajara (MX); Bruno Fornelli Campos, Tlaquepauge (MX); Victoria Elvira Arellano Echeverria, Guadalajara (MX)

(73) Assignee: CONTINENTAL AUTOMOTIVE SYSTEMS, INC., Auburn Hills, MI (US)

( * ) Notice: Subject to any disclaimer, the term of this patent is extended or adjusted under 35 U.S.C. 154(b) by 760 days.

(21) Appl. No.: 13/864,479

(22) Filed: Apr. 17, 2013

(65) Prior Publication Data

US 2014/0313763 A1 Oct. 23, 2014

(51) Int. Cl.
*B60Q 1/00* (2006.01)
*B60Q 3/04* (2006.01)
*B60K 37/02* (2006.01)

(52) U.S. Cl.
CPC ............... *B60Q 3/04* (2013.01); *B60K 37/02* (2013.01)

(58) Field of Classification Search
CPC ..... B60Q 1/2623; B60Q 3/04; F21S 48/1109; F21V 15/04; B60K 37/02
USPC ........................................................ 362/546
See application file for complete search history.

(56) References Cited

U.S. PATENT DOCUMENTS

| 4,342,074 A * | 7/1982 | Bull .................... B60Q 3/044 362/364 |
| 4,860,173 A * | 8/1989 | Jocher ................ F21S 48/1208 362/267 |
| 5,406,303 A * | 4/1995 | Salmon ................ B60K 35/00 116/DIG. 36 |
| 6,095,272 A | 8/2000 | Takiguchi et al. |
| 6,129,446 A * | 10/2000 | Hornung ................ F21V 23/04 362/295 |
| 6,241,368 B1 * | 6/2001 | Depino ................... F21V 21/04 362/147 |
| 6,378,934 B1 | 4/2002 | Palazzolo et al. |
| 6,439,744 B1 * | 8/2002 | Chanslor ................ F21S 4/001 248/511 |

(Continued)

FOREIGN PATENT DOCUMENTS

| CN | 1476395 A | 2/2004 |
| CN | 1576086 A | 2/2005 |

(Continued)

*Primary Examiner* — Bryon T Gyllstrom

(57) ABSTRACT

An instrument cluster assembly having a biasable member for reducing noise produced by vibration, where the instrument cluster assembly includes a light housing, a perimeter sidewall formed as part of the light housing, and at least one biasable member integrally formed with the perimeter sidewall. A mask is selectively connected to the light housing, and an inner perimeter sidewall is formed as part of the mask. The biasable member includes a base portion formed with the perimeter sidewall, and a flange portion integrally formed with the base portion. At least a portion of the flange portion is in contact with the inner perimeter sidewall of the mask, such that the flange portion deflects to absorb vibration between the light housing and the mask.

14 Claims, 4 Drawing Sheets

(56) References Cited

U.S. PATENT DOCUMENTS

| | | | |
|---|---|---|---|
| 2002/0003391 A1* | 1/2002 | Tsuda | F21S 48/1109 |
| | | | 313/318.01 |
| 2002/0085367 A1* | 7/2002 | Maxwell | B60K 37/02 |
| | | | 362/23.18 |
| 2002/0093223 A1 | 7/2002 | Hedderly | |
| 2002/0145876 A1* | 10/2002 | Juang | F21S 8/08 |
| | | | 362/378 |
| 2006/0092649 A1* | 5/2006 | Bynum | B60Q 3/0203 |
| | | | 362/488 |
| 2008/0117647 A1* | 5/2008 | Behr | F21S 48/1109 |
| | | | 362/547 |

FOREIGN PATENT DOCUMENTS

| | | |
|---|---|---|
| CN | 1620372 A | 5/2005 |
| CN | 202186292 U | 4/2012 |

* cited by examiner

VIBRATION ABSORBING FEATURES FOR PLASTIC ASSEMBLIES

FIELD OF THE INVENTION

Embodiments of the invention relate to a vibration absorbing feature for absorbing vibration and reducing noise generated by vibration in an instrument cluster.

BACKGROUND OF THE INVENTION

Instrument clusters are subject to various vibrations during the operation of a vehicle. Instrument clusters are used in a wide variety of vehicles, such as cars, trucks, sport utility vehicles, tractors, all-terrain vehicles, motorcycles, and the like.

These different types of vehicles generate different vibrations during travel. The vibration may originate from the engine, the transmission, or any other part of the vehicle. Furthermore, vibration may also result from the surface of the road. Variations in temperature may cause vibration issues as well, either from extreme change in temperature between winter and summer seasons, as well as fluctuations in temperature which occur over time. Over time, these various vibrations may cause noise, vibration, and harshness (NVH) issues in the interior of the vehicle (such as buzz, speak, and rattle noises). More particularly, the vibration may case various components in the interior, such as the instrument cluster, to rattle, vibrate, squeak, or generate some other type of noise, which is typically considered undesirable to the driver and passengers in the vehicle.

Accordingly, there exists a need for an instrument cluster which is resistant to vibration, where the vibration may vary in frequency and amplitude over time.

SUMMARY OF THE INVENTION

In some embodiments, the present invention is a vibration absorbing feature which is used to absorb vibration in an instrument cluster. In one embodiment, the present invention is an instrument cluster assembly having a biasable member for reducing noise produced by vibration, where the instrument cluster assembly includes a light housing, a perimeter sidewall formed as part of the light housing, and at least one biasable member integrally formed with the perimeter sidewall. A mask is selectively connected to the light housing, and an inner perimeter sidewall is formed as part of the mask. The biasable member is in contact with the inner perimeter sidewall of the mask, and deflects when relative movement occurs between the light housing and the mask, absorbing vibration between the mask and the light housing.

In one embodiment, the biasable member includes and a base portion formed with the perimeter sidewall, and a flange portion integrally formed with the base portion. At least a portion of the flange portion is in contact with the inner perimeter sidewall of the mask, such that the flange portion deflects to absorb vibration between the light housing and the mask.

The flange portion also includes an outer surface, a first end connected to the base portion, and a second end. A portion of the outer surface is part of the first end, and a portion of the outer surface is part of the second end. The second end is in contact with the inner perimeter sidewall such that when the mask and light housing move relative to one another, the second end deflects, absorbing vibration between the light housing and the mask.

In an embodiment, the flange portion is positioned at an angle relative to the perimeter sidewall such that as the flange portion deflects towards the perimeter sidewall by force applied from the inner perimeter sidewall, the inner perimeter sidewall contacts a larger area of the outer surface of the flange portion near the second end.

In one embodiment, there are six biasable members integrally formed with the perimeter sidewall, which are able to absorb vibration around the entire outer perimeter of the light housing. However, it is within the scope of the invention that more or less biasable members may be used. Furthermore, other types of biasable members may be used as well, such as springs, or the like.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
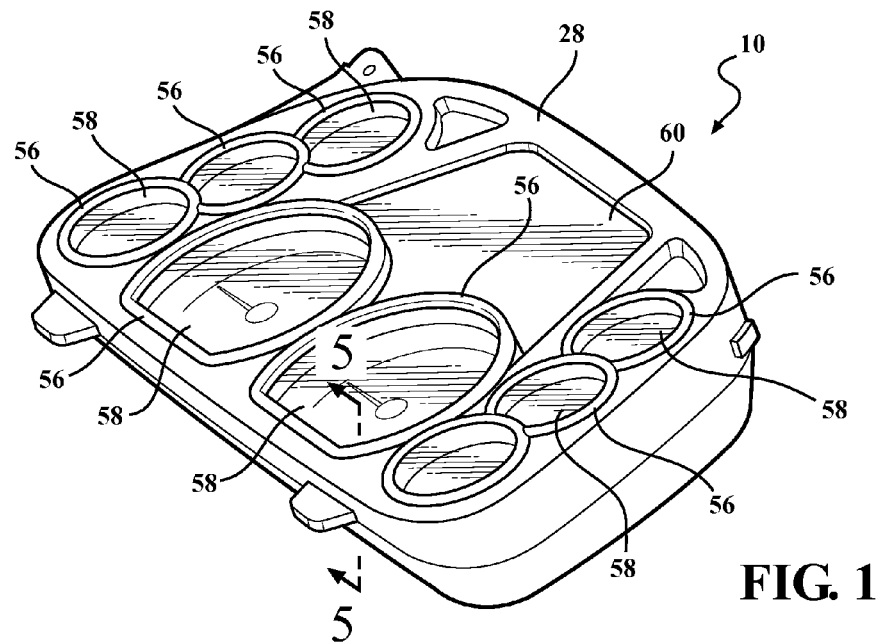
FIG. 1 is a perspective view of an instrument cluster assembly having a vibration absorbing feature, according to embodiments of the present invention.
Figure 2:
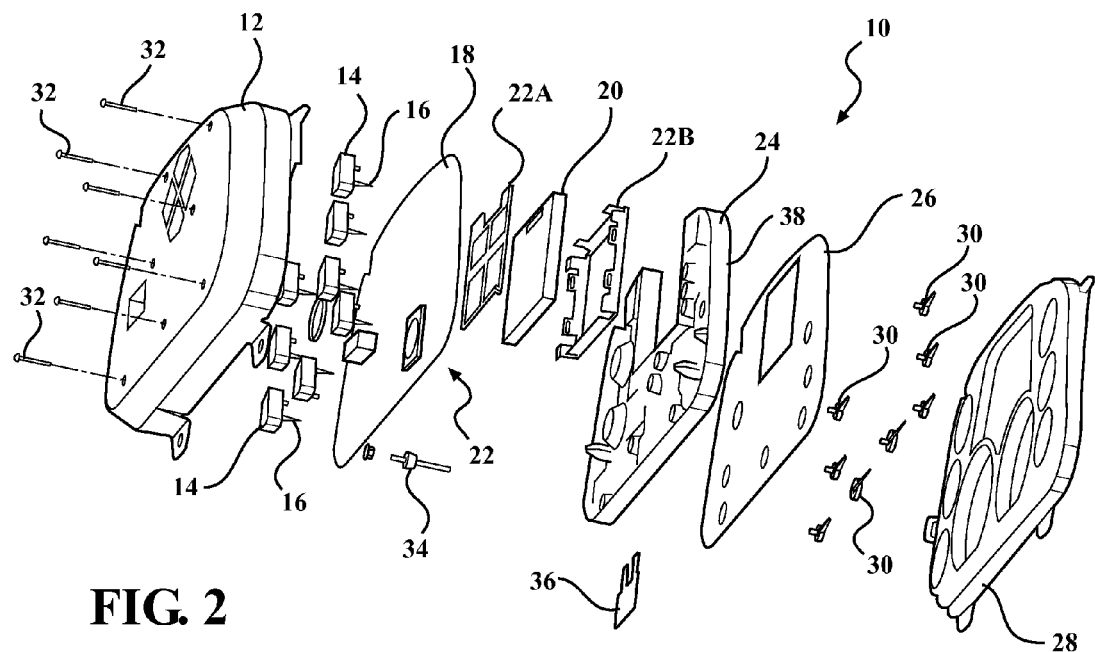
FIG. 2 is an exploded view of an instrument cluster assembly having a vibration absorbing feature, according to embodiments of the present invention.
Figure 3:
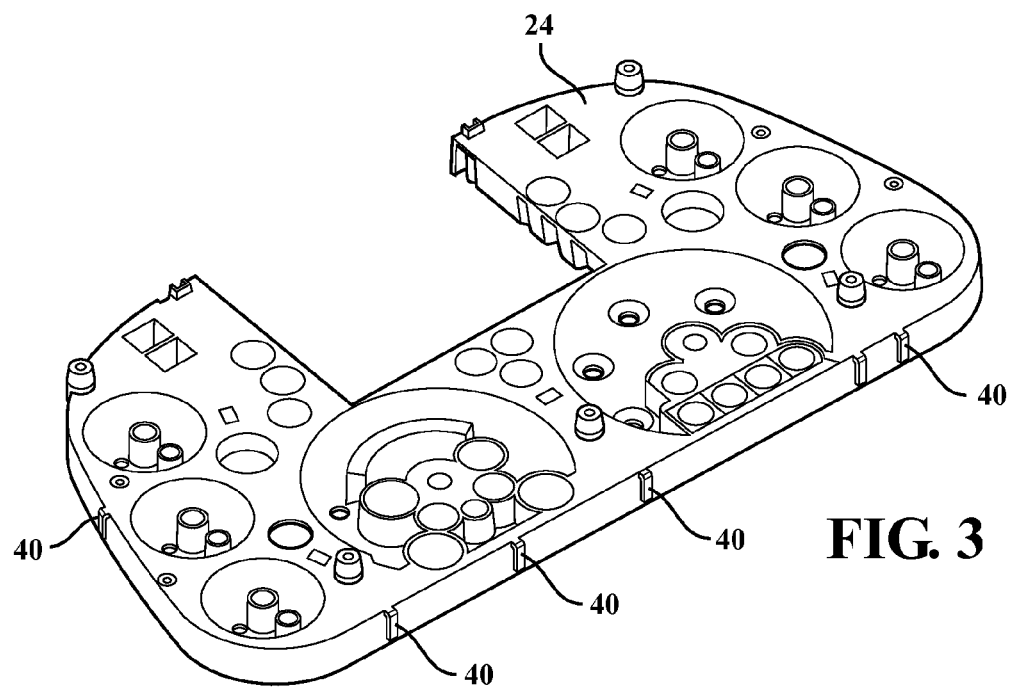
FIG. 3 is a perspective view of a light housing having at least one vibration absorbing feature, according to embodiments of the present invention.

An instrument cluster assembly having at least one vibration absorbing feature is shown in FIGS. 1-2, generally at 10. The instrument cluster assembly 10 is for use with different types of vehicles, such as cars, trucks, vans, sport utility vehicles, all-terrain vehicles, snowmobiles, buses, semi-trucks, and the like. The instrument cluster assembly 10 includes a back cover 12, and a plurality of actuator motors 14, each having a shaft 16. The assembly 10 also includes a printed circuit board (PCB) 18, a display 20 supported by a frame, shown generally at 22, having two pieces 22A and 22B, a light housing 24, a graphics layer 26 generally juxtaposed the light housing 24, and a mask 28. There is also a plurality of pointers 30, each one of the pointers 30 connects to a corresponding shaft 16 of one of the actuator motors 14. Each shaft 16 extends through the PCB 18, the light housing 24, and the graphics layer 26. During assembly, after the actuator motors 14 are in place, each pointer 30 is mounted on a corresponding shaft 16 such that each pointer 30 is in proper alignment with the desired portion of the graphics layer 26 having the corresponding graphics or scales. One pointer 30 is used for the area of the graphics layer 26 having the scale for the speedometer, another pointer 30 is used for the area of the graphics later 26 having the scale for the tachometer, and yet another pointer 30 is used for the area of the graphics layer 26 having the scale for the fuel gauge. The other pointers 30 are used for other areas of the graphics layer 26 having different scales for different gauges, such as the temp gauge, battery voltage gauge, and the like.

There is also a plurality of fasteners 32 which are used for connecting the entire assembly 10 together. In this embodiment, the fasteners 32 are threaded screws, each of which extends through the PCB 18, the light housing 24, the graphics layer 26, and into the mask 28, connecting these components together, and also correctly positions the actuator motors 14, as well as the frame 22 and display 20 together between the PCB 18 and the light housing 24. Also included as part of the assembly 10 is a tripometer reset switch 34 and a telltale card 36.

Referring now to FIGS. 3-7, the light housing 24 includes various shapes, contours, apertures, and recessed portions, to allow for positioning of various lighting devices, such as light emitting diodes (LEDs) or incandescent bulbs, such that the lighting devices project light through the various apertures of the light housing 24, and direct light through various desired portions of the graphics layer 26. The light directed through different portions of the graphics layer 26 is used to illuminate various scales and graphics on the graphics layer 26, such as the speedometer, tachometer, fuel gauge, temperature gauge, and the like.

The light housing 24 also includes a perimeter sidewall 38 which extends around the perimeter of the light housing 24. Formed as part of the sidewall 38 is at least one, and in this embodiment there is a plurality of, biasable members 40. Each of the biasable members 40 include a base portion 42 and a flange portion 44. The flange portion 44 is able to flex and deflect relative to the base portion 42. The flange portion 44 is in contact with an inner perimeter sidewall 46 formed as part of the mask 28. In this embodiment, there are six biasable members 40 formed as part of the perimeter sidewall 38, and therefore six flange portions 44 are in contact with the inner perimeter sidewall 46 formed as part of the mask 28. While is has been shown in the Figures that the instrument cluster assembly 10 is assembled using the fasteners 32, it is within the scope of the invention that the biasable members 40 may be used with an instrument cluster assembly that has no fasteners, such as screws, but is assembled using other approaches, while still minimizing or eliminating vibration, and NVH issues resulting from vibration.

The generally straight flange portion 44 includes a first end 48 generally perpendicularly connected to the base portion 42, and a second end 50 in contact with the inner perimeter sidewall 46. The flange portion 44 is also disposed at an angle 52 relative to the perimeter sidewall 38 such that as the flange portion 44 deflects towards the perimeter sidewall 38 by force applied from the inner perimeter sidewall 46, the inner perimeter sidewall 38 contacts a larger area of the outer surface 54 of the flange portion 44 near the second end 50.

After the components of the assembly 10 are connected together, the second end 50 of the flange portion 44 is in contact with the inner perimeter sidewall 46 of the mask 28. The mask 28 also includes several trim pieces 56 which surround several of the gauges 58 formed by the graphics layer 26 and the pointers 30. In addition to the components described above, also attached to the mask 28 is a lens 60 which covers substantially all of the graphics layer 26 and pointers 30, not only allowing the driver of the vehicle to see the pointers 30 and information provided by the graphics layer 26, but the lens 60 also protects the pointers 20 and graphics layer 26 as well.

Figure 4:
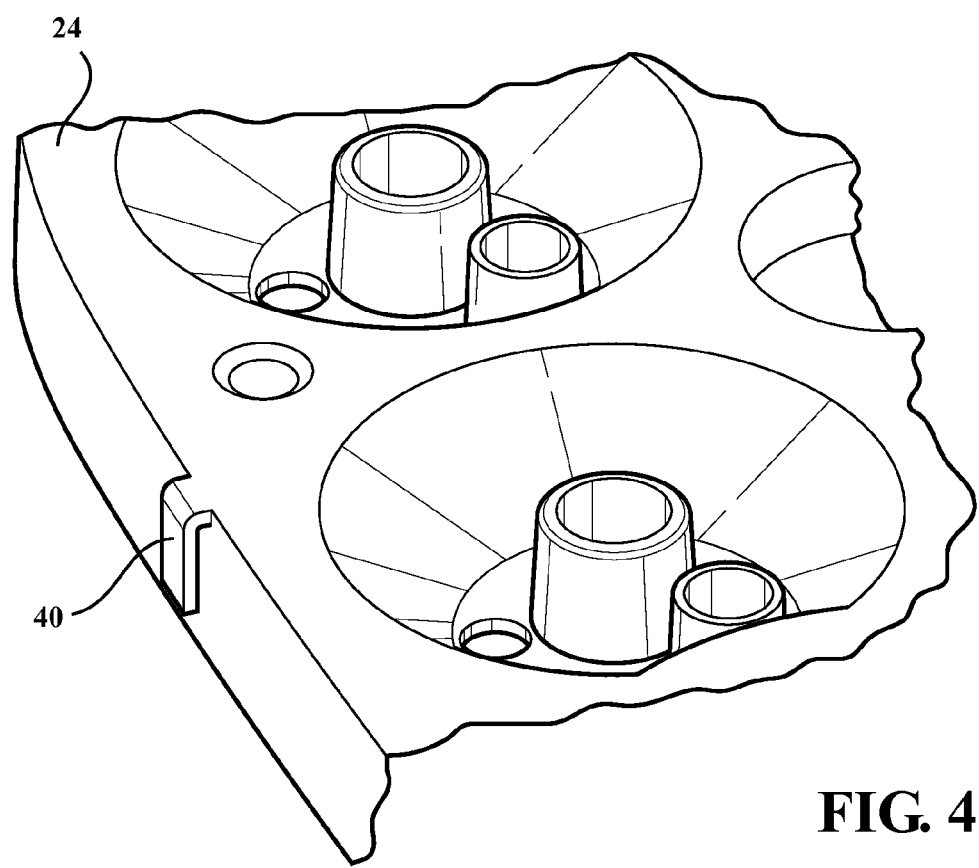
FIG. 4 is a first enlarged perspective view of a portion of a light housing having at least one vibration absorbing feature, according to embodiments of the present invention.
Figure 5:
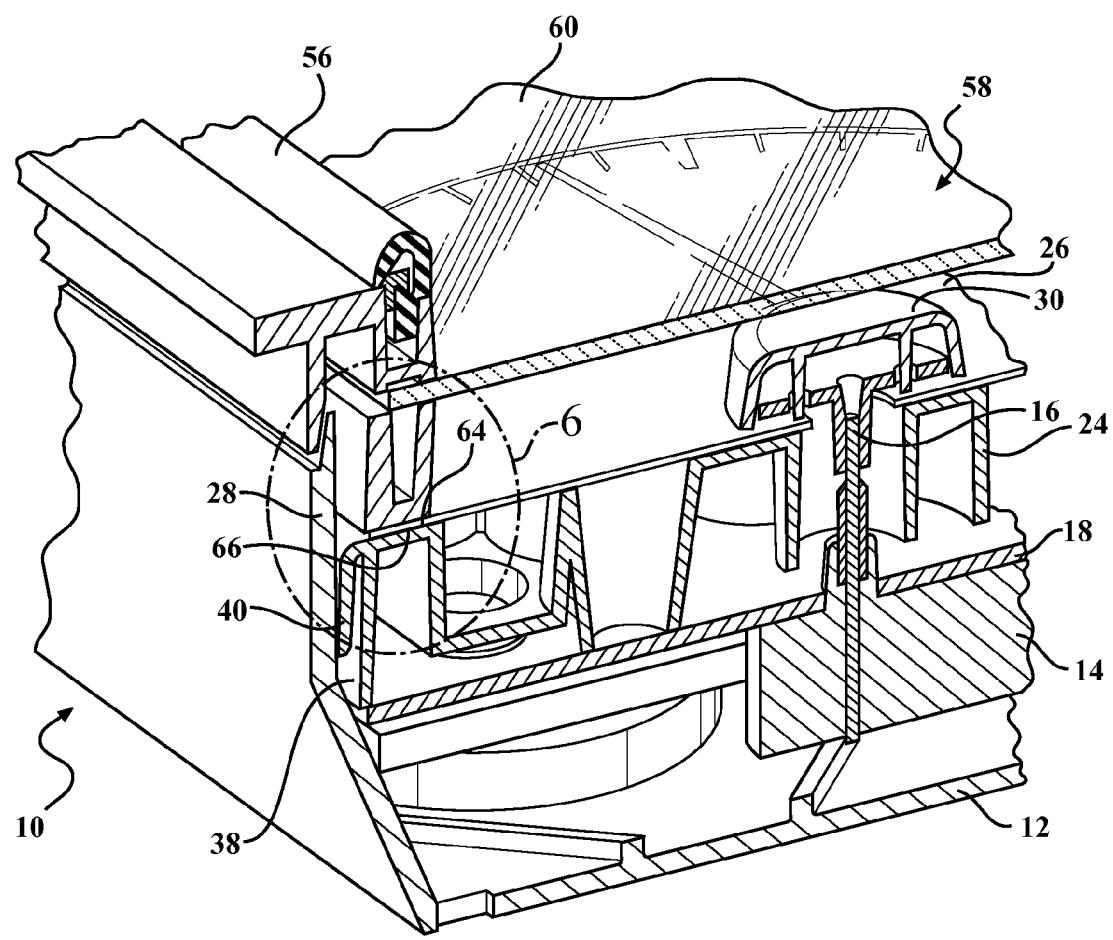
FIG. 5 is a sectional view taken along lines 5-5 in FIG. 1.

With specific reference now to FIGS. 4 and 5, during the operation of a vehicle incorporating the instrument cluster assembly 10, different vibrations are generated, depending upon the driving conditions, and the conditions of the road. The contact between the mask 28 and the light housing 24 is limited to the each area of the mask inner perimeter sidewall in contact with the outer surface in proximity to the second extreme end of the flange portion of each biasable member 40.

Figure 6:
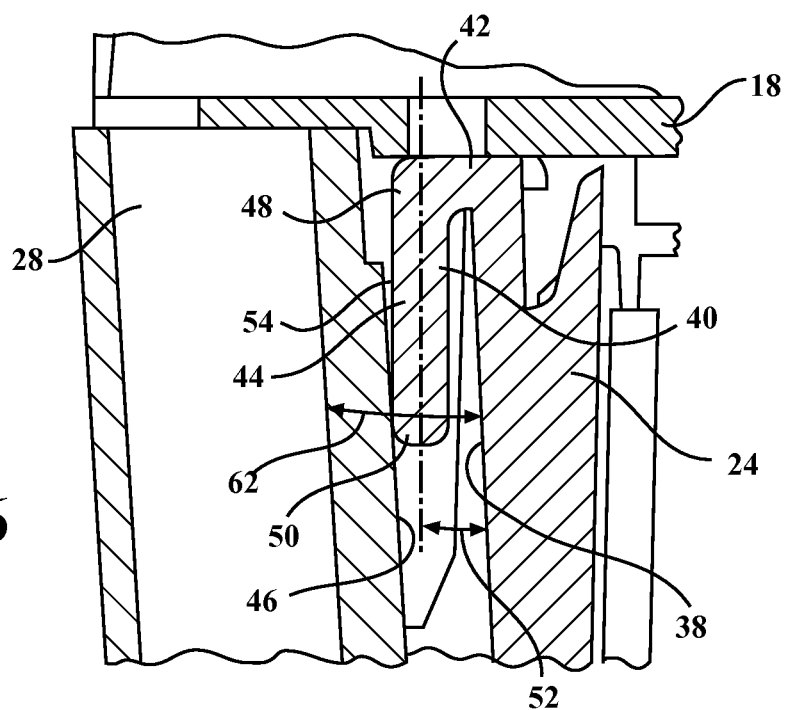
FIG. 6 is an enlarged view of an alternative embodiment of the present invention to that shown encircled in FIG. 5.
Figure 7:
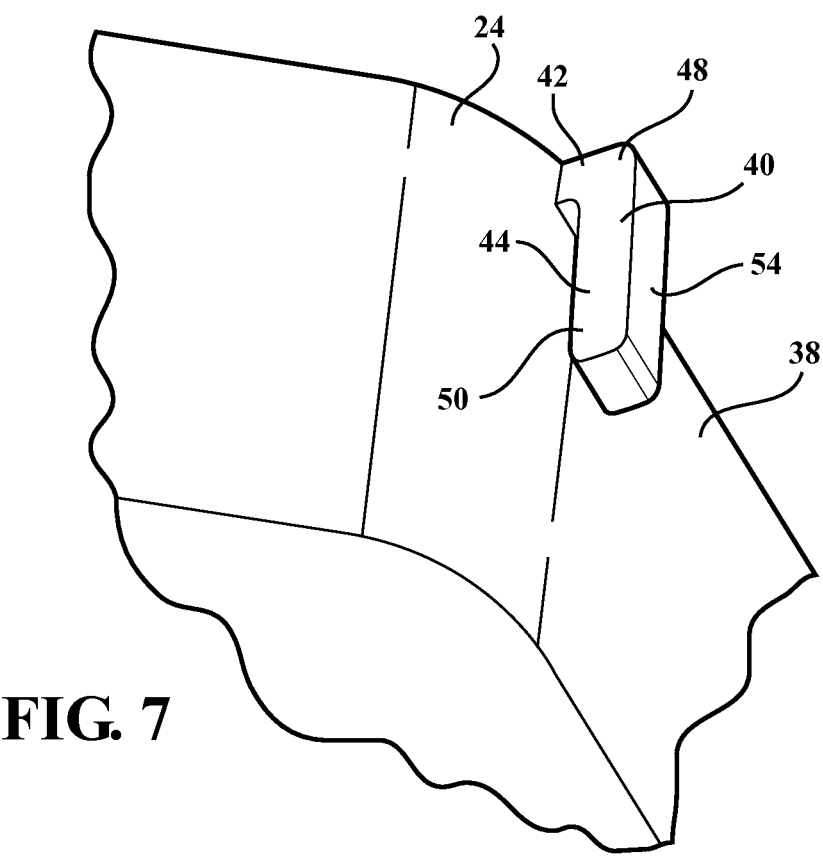
FIG. 7 is second enlarged perspective view of a light housing having at least one vibration absorbing feature, according to embodiments of the present invention.

In the embodiment of FIGS. 6 and 7, movement of the flange portion 44, more particularly the second end 50 of the flange portion 44, moves along an arc 62 as the flange portion 44 deflects, and there is relative movement between the mask 28 and the light housing 24. However, it is also within the scope of the invention that other biasable members 40 may be used in different locations to provide vibration absorption in different planes. For example, one of the biasable members 40 may be integrally formed with a top surface 64 of the light housing 24, such that the second end 50 of the flange portion 44 contacts the base surface of the mask, providing vibration absorption in a different plane.

In the embodiment of FIGS. 6 and 7, the angle 52 at which the flange portion 44 is located relative to the perimeter side wall 38 is such that when the mask 28 and the light housing 24 are assembled together, the flange portion 44 partially deflects, applying a pre-load to the inner perimeter sidewall 46. This "pre-load feature" or "pre-load position," limits the amount of relative movement allowed between the light housing 24 and the mask 28, acting to absorb vibration and prevent noise generated by the relative movement between the mask 28 and the light housing 24.

In other embodiments, the biasable member 40 may be other shapes as well. The biasable member 40 may be in the form of a spring, a flexible plate, a flexible shaft, ribs, domes, bumps, or any other component capable of deflecting when relative movement occurs between the mask 28 and the light housing 24, and is also able to absorb vibration between the mask 28 and the light housing 24.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   a instrument cluster assembly, including:
   a light housing;
   at least one biasable member integrally formed with the light housing;
   a graphics layer generally juxtaposed the light housing;
   a mask selectively connected to the light housing such that the at least one biasable member absorbs vibration between the light housing and the mask;
   a perimeter sidewall formed as part of the light housing, the at least one biasable member integrally formed with the perimeter sidewall;
   an inner perimeter sidewall formed as part of the mask;

a base portion integrally formed with the perimeter sidewall, the base portion being part of the at least one biasable member; and a flange portion being part of the at least one biasable member such that the flange portion is integrally formed with the base portion, the flange portion being in contact with the inner perimeter sidewall such that the flange portion deflects along an arc when there is relative movement between the light housing and the mask, absorbing vibration between the light housing and the mask;

wherein the mask is positioned such that the mask is only in contact with the flange portion of the at least one biasable member.

2. The apparatus of claim 1, the at least one biasable member further comprising a plurality of biasable members integrally formed with the perimeter sidewall.

3. The apparatus of claim 1, the flange portion further comprising:
an outer surface;
a first end connected to the base portion, a portion of the outer surface being part of the first end; and
a second end, a portion of the outer surface being part of the second end;
wherein the second end is in contact with the inner perimeter sidewall such that when the mask and light housing move relative to one another, the mask applies force to the second end of the flange portion causing the flange portion to deflect and absorb vibration between the light housing and the mask.

4. The apparatus of claim 3, wherein the flange portion is positioned at an angle relative to the light housing such that as the flange portion deflects towards the light housing by force applied from the mask, the mask contacts a larger area of the outer surface of the flange portion in proximity to the second end.

5. The apparatus of claim 4, wherein the biasable member flange portion is generally perpendicular to the base portion and the flange member is generally straight.

6. An instrument cluster assembly having a plurality of biasable members, comprising:
a light housing;
a perimeter sidewall integrally formed as part of the light housing;
a plurality of biasable members integrally formed as part of the perimeter sidewall;
a mask connected to the light housing;
an inner perimeter sidewall integrally formed as part of the mask;
each of the plurality of biasable members further comprising:
a base portion integrally formed to the perimeter sidewall; and
a flange portion integrally formed with the base portion;
wherein the inner perimeter sidewall is only in contact with the flange portion of each of the plurality of biasable members, and the flange portion of each of the plurality of biasable members deflect and move along an arc when there is relative movement between the mask and the light housing, absorbing vibration between mask and light housing.

7. The instrument cluster assembly having at least one a plurality of biasable members member of claim 6, each of the plurality of biasable members further comprising:
an outer surface;
a first end connected to the base portion, a portion of the outer surface being part of the first end; and
a second end, a portion of the outer surface being part of the second end;
wherein the second end is in contact with the inner perimeter sidewall such that when the mask and light housing move relative to one another, the mask applies force to the second end of the flange portion causing the flange portion to deflect and absorb vibration between the light housing and the mask.

8. The instrument cluster assembly having a plurality of biasable members of claim 7, wherein the flange portion is positioned at an angle relative to the light housing such that as the flange portion deflects towards the light housing by force applied from the mask, the mask contacts a larger area of the outer surface of the flange portion near the second end.

9. The instrument cluster of assembly of claim 8, wherein the bias able member flange portion is generally perpendicular to the base portion and the flange member is generally straight.

10. An instrument cluster assembly having a biasable member for reducing noise produced by vibration, the instrument cluster assembly comprising:
a light housing;
a perimeter sidewall formed as part of the light housing;
at least one biasable member integrally formed with the perimeter sidewall;
a base portion formed with the perimeter sidewall, the base portion being part of the at least one biasable member;
a flange portion integrally formed with the base portion, the flange portion being part of the at least one biasable member;
a mask selectively connected to the light housing; and
an inner perimeter sidewall formed as part of the mask;
wherein the inner perimeter sidewall of the mask is in contact with only a portion of the flange portion, such that the flange portion moves along an arc and deflects to absorb vibration between the light housing and the mask.

11. The instrument cluster assembly of claim 10, the flange portion further comprising:
an outer surface;
a first end connected to the base portion, a portion of the outer surface being part of the first end; and
a second end, a portion of the outer surface being part of the second end;
wherein the second end is in contact with the inner perimeter sidewall such that when the mask and light housing move relative to one another, the second end deflects, absorbing vibration between the light housing and the mask.

12. The instrument cluster of assembly of claim 11, wherein the flange portion is positioned at an angle relative to the perimeter sidewall such that as the flange portion deflects towards the perimeter sidewall by force applied from the inner perimeter sidewall, the inner perimeter sidewall contacts a larger area of the outer surface of the flange portion near the second end.

13. The instrument cluster of assembly of claim 12, wherein the bias able member flange portion is generally perpendicular to the base portion and the flange member is generally straight.

14. The instrument cluster of assembly of claim 10, the at least one biasable member further comprising six biasable members integrally formed with the perimeter sidewall.

* * * * *